May 17, 1932.  R. T. RICHART  1,858,341
AIRCRAFT WING
Filed Sept. 3, 1929
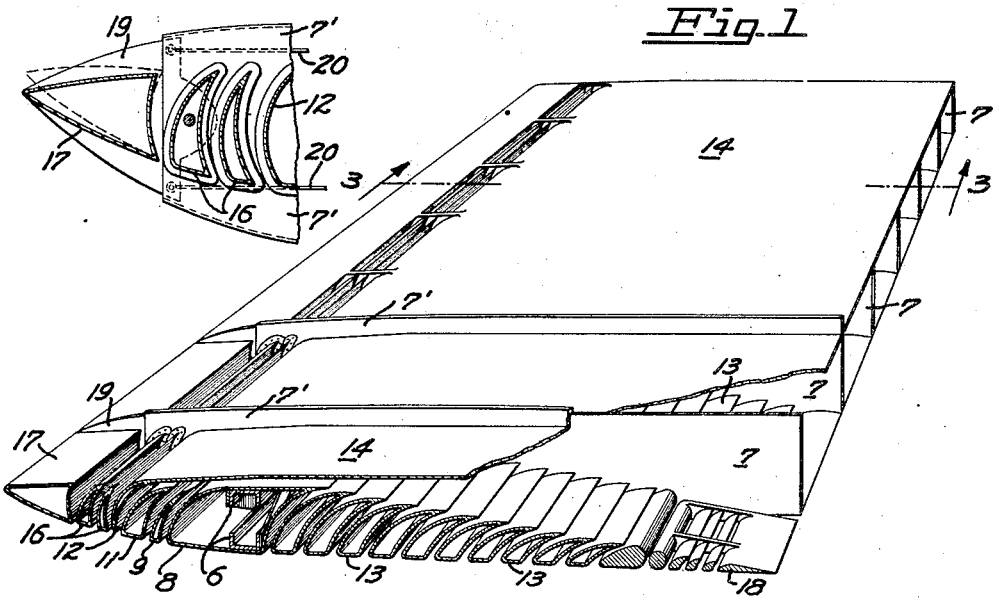
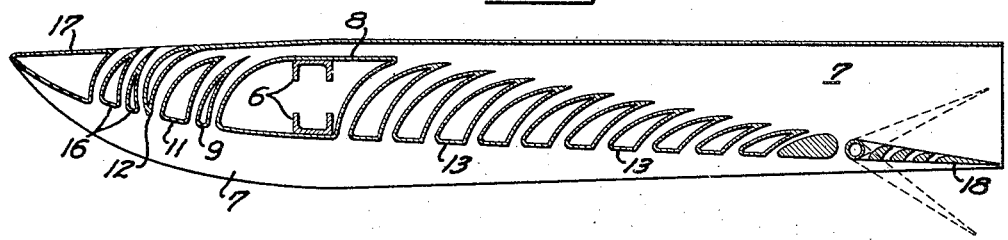
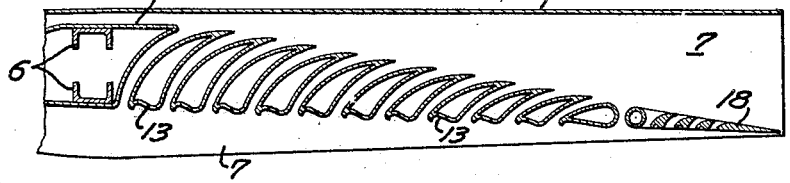
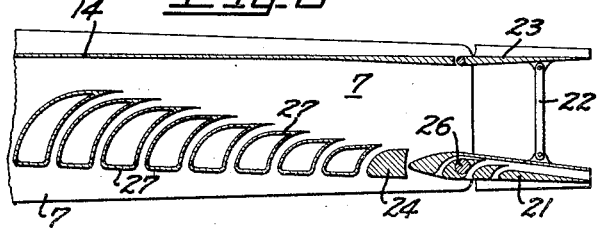
INVENTOR
ROLLAND T. RICHART
BY Charles S. Evans
HIS ATTORNEY Patented May 17, 1932

1,858,341

UNITED STATES PATENT OFFICE

ROLLAND T. RICHART, OF SANTA BARBARA, CALIFORNIA

AIRCRAFT WING

Application filed September 3, 1929. Serial No. 389,928.

My invention relates to wings or sustaining members for aircraft, and its broad purpose is to provide a wing having great natural stability and lifting power.

An object of my invention is to provide a wing in which the ratio of lift to drag is large.

Another object of my invention is to provide a wing which, when uncontrolled, will naturally assume its most effecting gliding angle.

Still another object of my invention is to provide a wing having great maneuverability.

A further object of my invention is to provide control means which, when associated with the wing of my invention, will combine ease of handling with safety.

A still further object of my invention is to provide a wing which will utilize the internal work of the wind to provide lift for the aircraft which it carries.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings:

Figure 1 is a perspective view showing a wing embodying my invention.

Figure 2 is a detail view on a larger scale, showing the construction and operation of the breaker point which comprises the leading edge of the wing.

Figure 3 is a longitudinal sectional view, taken on the line 3—3 of Figure 1, showing the general arrangement of the vanes comprising the wing body, and the action of the control fin.

Figure 4 is a sectional view similar to Figure 3, and showing a modification of the vane structure.

Figure 5 is a fragmentary sectional view, similar to Figures 3 and 4 showing still another modification of form of vane and a modified form of control fin.

In broadly descriptive terms the wing of my invention comprises a ceiling keel, the profile of which is preferably a flat curve extending approximately parallel to the normal line of flight of the wing. Beneath the ceiling keel a plurality of vanes or blades are arranged to form the body of the wing. Air channels between the vanes open upwardly and rearwardly thru the body into an air passage beneath the keel. Adjacent the leading edge of the wing, one or more air passages, similar in general form to those opening beneath the ceiling keel, preferably extend thru the wing body and open above the keel. The leading edge of the wing comprises a breaker point, which is so arranged as to deflect the slip-stream beneath at least one channel when the wing is in normal flight.

In case the wing is stalled, the breaker point no longer operates in this manner and these last mentioned channels, breaking the vacuum formed upon the upper surface of the wing, permit it to nose down and assume its normal gliding angle.

The lower surface of the vanes diverges slightly from the ceiling keel toward the trailing edge of the wing, and when the wing is in flight the air under these surfaces is compressed. The pressure thus formed is relieved thru the air channels, the air acquiring a substantial velocity which reacts against the curved surfaces of the vanes to supply an additional lift to the craft. The channels discharge rearwardly into the air passage beneath the ceiling keel, and thus serve to break the vacuum which forms the major factor of drag upon any type of wing. A movable control fin, arranged adjacent the trailing edge, controls the conformation of the outlet of this air passage and so serves as a control member.

In more detailed terms, a preferred form of wing is supported by a beam 6 which may be attached to the body of the aircraft in any conventional manner. This beam is preferably located closely against the center of pressure of the wing. Carried upon the beam 6, at intervals which are dependent upon the dimensions of the wing itself, but which in the present instance may be considered as of the order of one foot, are a plurality of vertical keels 7 which may be formed of thin sheet metal, and which act as ribs for the wings. Although these keels are referred to as vertical, for the sake of convenience, this merely indicates their general direction, as they may incline materially from the true vertical in case it is desired to give the wing a dihedral angle.

Supported by the vertical keels, and preferably extending directly thru them, are a plurality of curved reaction vanes. One of these vanes, 8, preferably surrounds the wing beam, and is accordingly materially larger than the others. One or more vanes 9, 11 and 12 are located in front of the vane 8, and form between them air channels passing upward thru the body of the wing. Behind the vane 8 another series of vanes 13 of graduated size, extends the greater part of the distance to the trailing edge of the wing.

The vertical keel extends both above and below the vanes 13. The upper edge of the vertical keel is preferably straight, at least as far forward as the beam 6. Ahead of this point it may be depressed at a slight angle or curve, i. e., about three degrees, to the leading edge of the wing.

Extending backward from the vane 12 over the vertical keels, is a ceiling keel 14, preferably a sheet of thin metal, although it may be formed of ply-wood or fabric. The ceiling keel preferably extends the entire distance to the trailing edge of the wing, forming an air passage above the vanes which comprise the wing body. Due to the graduated size of the vanes 13 this air passage expands toward the rear edge of the wing.

Located ahead of the vane 12 is at least one and preferably a plurality of vanes 16, which form air channels extending thru the body of the wing and opening above the ceiling keel 14. These channels, like those formed between the vanes 13, are curved; but their general direction is more nearly vertical than that of the channels opening beneath the ceiling keel, and they may even slant forward as is shown in the detailed view of Figure 2. The direction of these channels is dependent upon the normal flying speed of the wing, the backward slanting vanes being especially adapted for slow speed work and for stability, while the forwardly slanting vanes are adapted for stunting and for high speed work.

A breaker point 17 forms the leading edge of the wing. In contrast to wings of ordinary airfoil section, the breaker point is relatively sharp, its upper surface forming in reality a continuation of the ceiling keel 14; its lower surface curving downward to deflect the slip-stream, i. e., the air passing over the wing, past the opening of the channels between the vanes 16.

Considering the lower surface of the vanes forming the wing body as a whole, it will be noted that it curves downward from the breaker point to a point which is substantially beneath the center of pressure and load of the wing, and then slants backward and downward on a substantially straight line toward the trailing edge.

Located at the trailing edge of the wing is a movable fin 18, which may either comprise solid surfaces or may be constructed of vanes in a manner similar to the wing proper. This fin may extend the entire distance across the wing, or it may be limited to perhaps the inner half of the trailing edge. If desired the fin may be used as an aileron, but preferably it is semi-permanently set to control the conformation of the air passage beneath the ceiling keel and is adjusted to load and to flying speed, separate aileron control being provided at the outer edge of the wings in the usual manner.

In the air the wing assumes a flying position substantially parallel to the rearward portion of the ceiling keel. At flying speed the air is compressed by the lower surface of the wing, and escapes upward thru the air channels between the vanes, being deflected rearwardly at its discharge from these channels. The change in direction of the air thru the channel reacts against the vane in a manner similar to the reaction of fluids against a turbine blade, providing lift for the wing. The discharge thru these channels relieves the vacuum which otherwise would be formed above the wing body, and largely if not completely eliminates the drag upon the wing due to this cause. The lift upon the wing is therefore derived almost entirely from the lower and concave surfaces of the vane, instead of being derived from the vacuum above the wing as is the case with the usual airfoil section. Since the ceiling keel is parallel to the line of flight no appreciable reduction in pressure occurs above it.

In case of stalling, the breaker point ceases to deflect the air past the vanes 16, which therefore relieve the partial vacuum formed above the nose of the wing, and allows it to nose down. This permits the wing automatically to assume normal gliding angle, and it quickly attains speed and lift which permits of its control.

The vane structure of the wing allows it to utilize the so-called internal work of the wind, that is, its momentary differences in velocity, to attain both lift and flying speed. Thus a sudden gust serves to increase the pressure against the lower surface, and this pressure, relieving itself through the channels between the vanes, gives both an upward and a forward reaction which serves to shoot the wing ahead. A sudden upward current or bump has the same effect, increasing the speed of light, and the kinetic energy thus imparted to the wing and to the craft which it carries, may be utilized to attain height, or merely to increase speed.

Although the breaker point 17 has thus far been considered stationary, and may be so in fact, it may be made movable as is shown in Figures 1 and 2 and used as a means of control in flight. In this case the breaker point is pivoted upon the vertical keels, and is arranged to move about the center of curvature of its rear edge, so that the conformation of the air channel of which is forms a part is not materially changed. As is shown by the dotted lines of Figure 2, however, change in its position serves to alter the amount by which its lower edge deflects the slip-stream past the forward air channels, while the reaction of its upper and lower surfaces against the slip-stream may be utilized to perform the office of an elevator.

The vertical keels 7' upon which the breaker point is pivoted are made double, and are extended above the ceiling keel. The breaker point is carried upon extensions 19 of the vertical keels which work between the walls of the double keels 7', and the control lines 20 are attached to these extensions as is shown in Figure 2.

The structure as thus set forth is capable of a number of material modifications in specific instances and as to detail without altering its fundamental action. It has already been pointed out that the present construction practically eliminates the drag due to the vacuum formed behind the wings. There remains the element of skin friction, which becomes increasingly important at high speed. This may be partly overcome by the structure shown in Figure 4.

The concave formation of the lower surfaces of the vanes, form eddies upon which the wing may be conceived as rolling. The formation of these eddies consumes a considerable amount of energy, and at low speed has a material retarding effect. At high speed, where air viscosity assumes large proportions, the energy going into the formation of eddies is less than that normally due to viscosity, and an increase in speed results.

The simple fin structure shown in Figures 1, 3 and 4, acts to constrict or to open the air passage to the rear of the wing. As an alternative to this structure that shown in Figure 5 may be used. In this case the size of the opening is not changed, but its direction is under control, the discharged air being forced up or down in accordance with the position of the controlling fin. The fin 21 is in this case pivoted in a manner similarly to the fin 18 in the other figures. Pivotally connected to the fin 21 by the link 22 is an upper fin 23 which is a continuation of the ceiling keel 14. In this figure the fin 21 is shown as being substantially a miniature wing of the type here described. The nose of the fin works behind the vane 24, whose rear surface is an arc centering upon the pivot 26 of the fin. The controls are so arranged that the leading edge of the fin never extends either above or below this curve, and there is therefore at all times pressure on both sides of the fin, giving it stability and ease of control.

Figure 5 also shows a modification of the form of vane. In this case the vanes 27 are so formed that the air channels between them discharge directly to the rear of the plane, instead of slightly upward as is in the case of the fin 13 of the other figures. This form of vane has been found very effective, which indicates that wide latitude is possible in the design of the wing.

It should be noted that while the wing ordinarily flies with full normal air pressure against the upper surface of the ceiling keel, this condition is altered in case of a stall. Under this condition a vacuum is formed above the keel as the wing starts to fall, adding lift to that due to the reaction of the air against the lower surface and through the vanes. The forward air channels act to cause the wing to nose down as has already been explained, while the forward reaction of the air through the vanes restores flying speed.

I claim:

1. A wing comprising a ceiling keel, and a plurality of vanes arranged beneath said keel and forming air channels curving upwardly and rearwardly of said wing.

2. A wing comprising a plurality of vertical keels, a ceiling keel extending over said vertical keels, and a plurality of vanes arranged transversely of said vertical keels and beneath said ceiling keel.

3. A wing comprising a plurality of vertical keels, a ceiling keel extending over said vertical keels, and a plurality of vanes arranged transversely of said vertical keels and beneath said ceiling keel, said vertical keels extending materially below said vanes.

4. A wing comprising a ceiling keel and a plurality of curved reaction vanes arranged beneath said keel, said vanes being of decreasing size from adjacent the center of mass of the wing toward the trailing edge thereof.

5. A wing comprising a ceiling keel and a plurality of curved reaction vanes arranged beneath said keel, said vanes being spaced from said keel to form an air passage enlarging toward the trailing edge of said wing.

6. A wing comprising a ceiling keel and a tapering body angularly disposed beneath said keel, said body comprising a plurality of curved reaction vanes extending longitudinally of the wing.

7. A wing comprising a ceiling keel and a tapering body angularly disposed beneath said keel, said body comprising a plurality of reaction vanes disposed to form air channels curving upwardly and rearwardly through said body.

8. A wing comprising a ceiling keel arranged substantially parallel to the normal line of flight of the wing, and a tapered body arranged beneath said keel to form an air passage enlarging from adjacent the center of mass of said wing toward the trailing edge thereof, said body comprising a plurality of curved reaction vanes forming air channels opening upward into said air passage and having a lower surface whose trailing edge is depressed with respect to said normal line of flight.

9. In a wing, a wing body having a tapered leading portion and a tapered trailing portion, said body comprising a plurality of vanes forming curved air channels passing upward thru said body, and a ceiling keel disposed above the body, one of the air channels in the leading portion opening above said ceiling keel.

10. In a wing, a body comprising vanes forming an air channel passing upward thru said body, and a breaker point movable to deflect the slip stream over said wing past said air channel when the wing is traveling at its normal flying speed.

11. A wing comprising a ceiling keel, a body comprising a plurality of curved reaction vanes arranged beneath said keel and forming air channels opening upwardly and rearwardly into a rearwardly expanding air passage beneath said keel and a movable fin arranged adjacent the trailing edge of said body for altering the conformation of said air passage.

12. A wing comprising a body built up of a plurality of vanes, each of said vanes curving upwardly and rearwardly of the body, a vane adjacent the leading edge of the body having a sheet portion extending rearwardly of the body and over other of said vanes to provide a ceiling keel.

13. A wing comprising a body built up of a plurality of vanes, each of said vanes curving upwardly and rearwardly of the body, a vane adjacent the leading edge of the body having a sheet portion extending rearwardly of the body and over other of said vanes to provide a ceiling keel, and a breaker point movably mounted adjacent the leading edge of the body.

14. A wing comprising a body built up of a plurality of vanes, each of said vanes curving upwardly and rearwardly of the body, a vane adjacent the leading edge of the body having a sheet portion extending rearwardly of the body and over other of said vanes to provide a ceiling keel, and a fin movably mounted adjacent the trailing edge of the body.

15. A wing comprising a body built up of a plurality of vanes, each of said vanes curving upwardy and rearwardly of the body, a vane adjacent the leading edge of the body having a sheet portion extending rearwardly of the body and over other of said vanes to provide a ceiling keel, a breaker point movably mounted adjacent the leading edge of the body, and a fin movably mounted adjacent the trailing edge of the body.

In testimony whereof, I have hereunto set my hand.

ROLLAND T. RICHART.